March 5, 1963 G. E. MATHER 3,080,177
LEVELIZING SUSPENSION FOR VEHICLES
Filed Nov. 26, 1957 2 Sheets-Sheet 1

INVENTOR.
GLENN E. MATHER
BY
ATTORNEYS

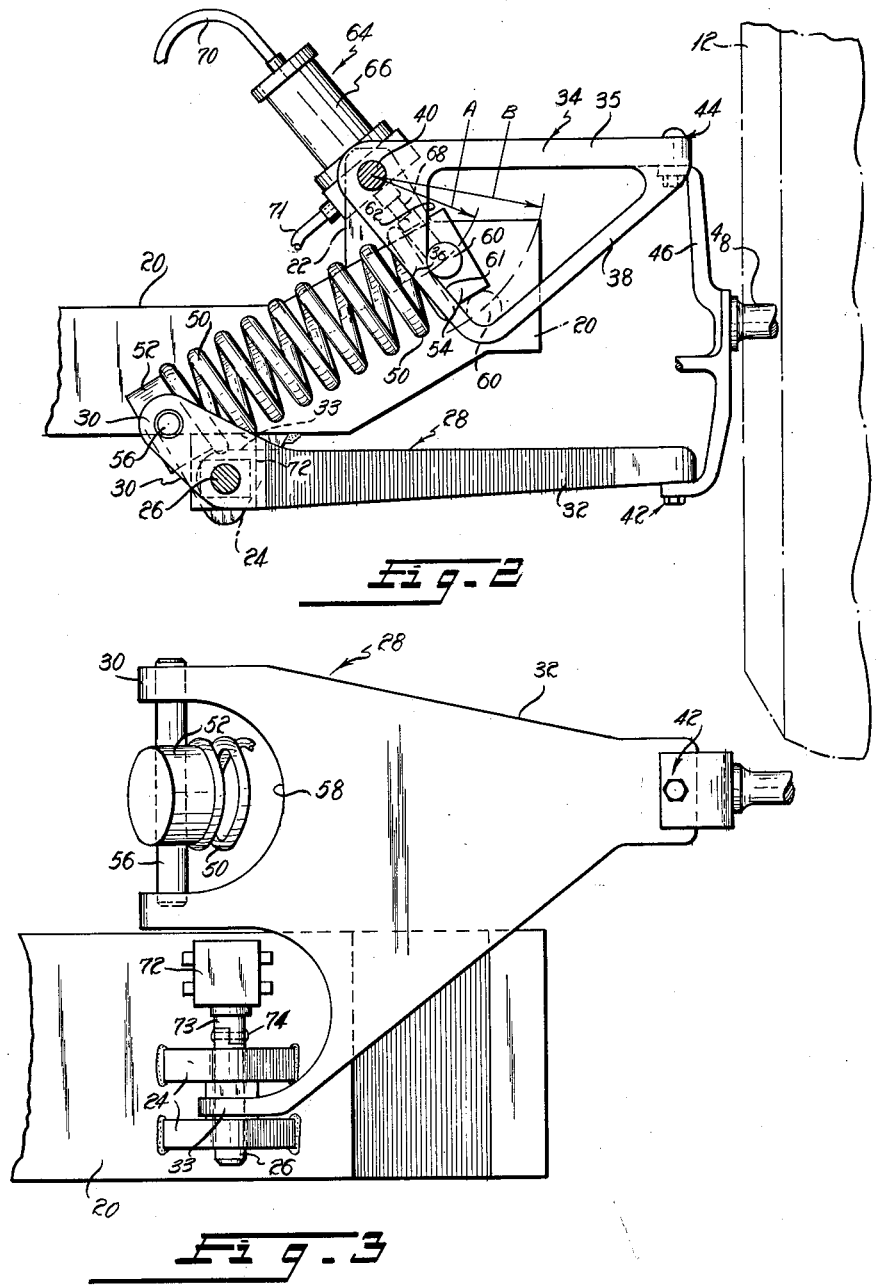

United States Patent Office 3,080,177
Patented Mar. 5, 1963

3,080,177
LEVELIZING SUSPENSION FOR VEHICLES
Glenn E. Mather, Logansport, Ind., assignor to Rockwell
Standard Corporation, a corporation of Pennsylvania
Filed Nov. 26, 1957, Ser. No. 698,981
8 Claims. (Cl. 280—124)

This invention relates to vehicle wheel suspension apparatus for motor vehicles and more particularly to independent wheel suspension assemblies which include self actuating fluid pressure operated levelizers.

The art of utilizing a coil spring as an independent wheel suspension is well known as is a suspension utilizing a coil spring between two pivoting lever arms, shown for example in U.S. Patent No. 2,621,919 issued December 16, 1952. Many such devices or similar ones are incorporated in motor vehicles in efforts to increase their riding comfort.

The same is true of hydraulic levelizers of which a variety of types have been designed to level the body frame under varying static and dynamic loads. Such devices have been widely used in buses and delivery trucks where the load changes constantly as shown for example in U.S. Patent No. 2,687,311 issued August 24, 1954. Hydraulic levelizers may be either fully automatic, self actuating or controlled by the vehicle operator.

A primary object of this invention resides in the provision for vehicles of a novel combination of coil spring wheel suspension and levelizer in one assembly which is fully automatic and thus does not require the attention of the driver.

A further object of the invention resides in the provision of a spring suspension comprising a novel arrangement of support control arms pivotally mounted on the vehicle frame.

An additional object of the invention resides in the provision of a novel wheel suspension assembly including two support control arms pivotally connected to a frame member of a vehicle, one of the control arms having a spring connected thereto, the spring being shiftable in a line transverse to the axis of the coil spring to change the effective force applied by the spring to the control arm whereby the frame is maintained in a desired position in relation to the wheel axle.

A still further object resides in the provision of a novel vehicle combination including the vehicle frame supported by ground engaging wheels mounted on transverse axle assemblies with an automatic levelizing suspension mechanism on each wheel which substantially immediately individually adjusts the level of the frame portion adjacent each wheel relative to the position of the wheel whenever the relative positions change because of changed static or dynamic loads.

Still another object of the present invention resides in the provision of improved self-actuating levelizers for suspension assemblies, which include a valve which is closed or opened by movement of one of the suspension arms to actuate a fluid motor to move the point of connection of the main load-carrying spring to a moment arm in the suspension assembly.

It is another object of the present invention to provide in an improved self-actuating hydraulic levelizer system for vehicle suspension assemblies, a valve which is closed and opened by means of a solenoid actuated by a two-way switch connected to one of the control arms of the levelizer.

It is a further object of the present invention to provide improved combined suspension and levelizing mechanisms which are adapted for use in the suspension of either front or rear wheels and which, when used to suspend the rear axle, permit the use of conventional rear end assemblies without torque tubes or radius arms found in other levelizing units since the load is transmitted directly by the spring suspension to the frame of the vehicle.

It is a further object of the present invention to provide improved self-actuating fluid operated levelizing systems which eliminate excessive body sway when the vehicle is taken around a curve and reduce or eliminate the brake dive at the front end of the vehicle when the brakes are applied.

It is an additional object of the present invention to provide improved wheel suspension systems which comprise inexpensive and easy to manufacture parts which are simply and quickly assembled and installed and which require a minimum of maintenance.

It is also an object of the present invention to provide improved fluid actuated fully automatic levelizing suspension systems of simple construction which require only low or moderate constant operating pressures.

Further novel features and other objects of this invention will become apparent from the following detailed description, discussion and the appended claims taken in conjunction with the accompanying drawings showing preferred structures and embodiment, in which:

FIGURE 2 is an enlarged front elevation of one of the front wheel suspension and levelizing assemblies;

FIGURE 3 is an enlarged bottom plan view of the front suspension lower control arm with the other suspension components omitted for clarity.

Figure 1:
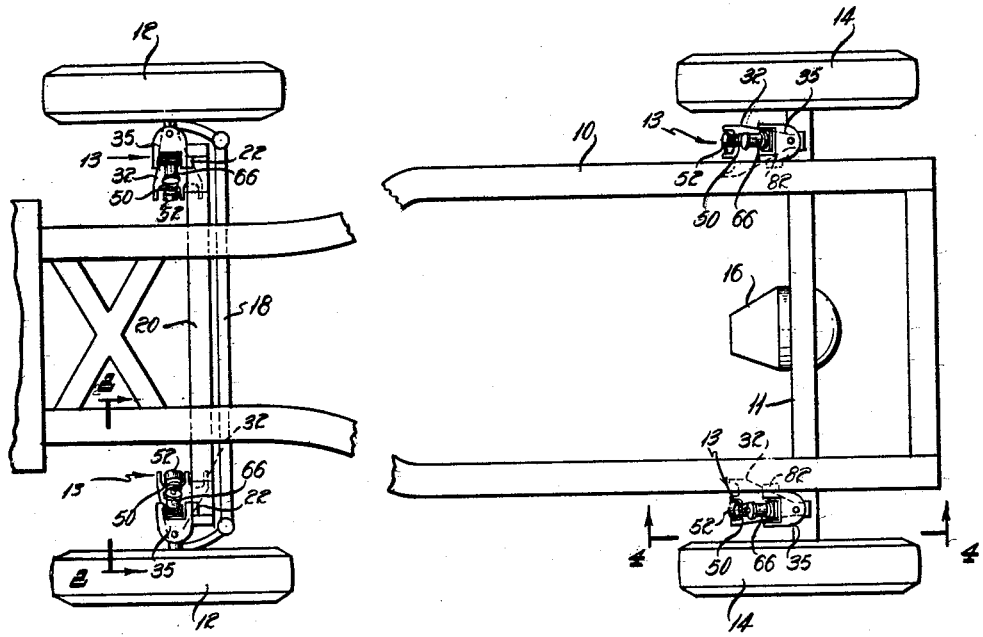
FIGURE 1 is a top plan view of a motor vehicle frame supported by one form of suspension and levelizing mechanism made in accordance with the teachings of this invention.

In referring to the drawings for a detailed description of the invention, like reference characters will refer to like parts throughout. FIGURE 1 illustrates a motor vehicle frame 10 to which front wheels 12 are spring suspended by the assemblies 13 of the present invention. Rear axle 11 which carries rear wheels 14 is spring connected to the frame by a second pair of assemblies 13. A power plant (not shown) is drive connected in conventional manner through a differential 16 to the rear wheels 14. The steering linkage includes the usual transverse tie rod 18.

Referring now to FIGURE 2 of the drawings, the front wheel suspensions are mounted on the ends of a transverse member 20 of frame 10. Rigidly secured to the ends of frame member 20 are an upper mounting bracket 22 and a pair of lower brackets 24. Brackets 24 mounted under the frame member 20 journal a shaft 26 which supports a generally triangularly shaped lower suspension and control arm 28, which is in the form of a bell crank (FIGURE 2) having a short lever arm 30 formed on one side of the base of the triangular arm 28 and a long lever arm 32. The shaft 26 extends through a fitting rigid with the flat mounting portion 33 of the lower control arm 28 and is fixed to turn with the control arm as the control arm moves about its pivot axis. The upwardly extending short lever arm 30 is positioned to the side of the frame member 20.

An upper suspension support and control member 34 has spaced upper arms 35 above and substantially parallel to the lower control arm 28. Depending from each of the arms 35 is a generally triangular shaped member with the sides formed by upper arm 35, an intersecting moment arm 36 and a linking arm 38. The upper control member 34 is pivotally mounted substantially at the intersection of control arms 35 and moment arms 36 on a shaft 40 journalled in the bracket 22 and projecting forwardly from the frame 20.

The outer ends of lower control arm 28 and upper control arm 34 are connected by ball and socket joints 42 and 44 respectively to a steering knuckle 46 having an axle 48 on which the front wheel 12 is mounted as shown in FIGURE 2. A coiled tension spring 50, having lower and upper end spring retaining plugs 52 and 54, respectively, is connected by a pin 56 extending through the lower spring retaining plug 52 to the arms formed at the sides of a cut-out yoke shaped portion 58 in the short arm 30 of lower control lever 28. In a typical case the spring 50 is of No. 531 tempered wire of 2½" inside diameter having 12 close coils, approximately 300 lbs. initial tension and a spring rate of about 510 lbs. per inch. The upper spring end plug 54 is disposed between the depending triangular sides of control member 34 and a roller pin 60, which projects through plug 54 normal to the spring axis, has its ends projected into the open areas of the triangular sides above the moment arms 36. Thus the ends of roller pin 60 are biased by tension spring 50 against the upper surfaces 61 of the moment arms 36 and provide a shiftable pivot connection between the upper end of the spring 50 and the moment arms 36. Thus lower arm 28, upper arm 34, spring 50 and steering knuckle 46 serve as a spring loaded suspension between frame member 20 and wheel 12.

Vertical surfaces 62, formed at the upper ends of surfaces 61 of the moment arms 36 serves as a limit stop for the upward movement of roller pin 60, which movement shortens the effective moment arm, while the intersection of linking arm 38 and the other end of surface 61 serves as a limit stop for downward movement of roller pin 60, which movement lengthens the effective moment arm through which the spring force acts.

A double-acting fluid motor 64, including a cylinder 66 is pivotally mounted on the suspension upper pivot shaft 40 and has its piston rod 68 connected to the roller pin 60 in the spring end plug 54. Reciprocation of piston rod 68 shifts the pin 60 connecting the upper end of tension spring 50 to the moment arms 36 to change the effective length of moment arms 36 within the limits denoted by surfaces 62 and linking arms 38.

Flexible conduits 70 and 71 connected to the opposite ends of cylinder 64 lead to a valve 72, the stem 73 of which is connected by a pin 74 to rotate with the pivot shaft 26 which turns with the lower suspension and control arm 28.

Preferably the valve 72 is a four way valve adapted to connect either of conduits 70 or 71 to a source of pressure (not shown) while connecting the other conduit to exhaust. When the suspension system occupies the position shown in FIGURE 2 the valve closes conduits 70 and 71 to thereby lock piston rod 68 against movement.

Figure 4:
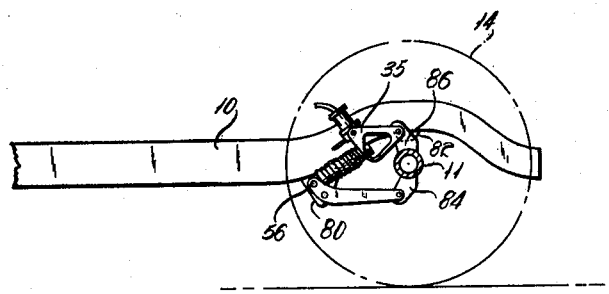
FIGURE 4 is a side elevation of one of the rear wheel suspension and levelizing assemblies.

FIGURE 4 of the drawing illustrates the same suspension and levelizing mechanism illustrated and described with reference to FIGURES 2 and 3 of the drawing except that the mechanism is mounted on the rearward portion of the vehicle frame for connection to the rear axle 11 of the vehicle. As shown, the pivot axes of the rear suspension system are substantially parallel to rear axle 11.

The mounting of the rear suspension and levelizing mechanism is accomplished by pivotally connecting lower suspension and control arm 28 and upper suspension and control member 34 to mounting brackets 80 and 82 rigidly secured to the vehicle frame 10. The opposite ends of the lower control arm 28 and upper control member 34 are pivotally connected to mounting brackets 84 and 86 rigid with the rear axle 11. Since the rear wheels are not steerable, ball and socket joints as illustrated in FIGURES 2 and 3 of the drawing are not necessary. The operation of the suspension and levelizing mechanism of this invention is essentially the same for both front and rear wheels.

Thus whenever the load changes, the lower control arm 28 turns shaft 26 which opens valve 72 an amount sufficient to introduce enough hydraulic fluid in hydraulic cylinder 66 to actuate piston rod 68 to move the roller pin 60 to a point along moment arm 36 where the force applied by tension spring 50 returns the control arms 28 and 34 and their associated members to a state of equilibrium or neutral position. When the neutral position is reached, the piston rod 68 and roller pin 60 are held in fixed position in relation to moment arm 36 until load conditions again change. Thus the height or level of the frame 20 in relation to the axle 48 remains constant regardless of the applied load within the range of the system.

The suspension and levelizing systems of the present invention can be used either for passenger cars or for heavy duty truck applications. In the latter case the rapid levelizing action of the system is effective to hold a trailer at the level of the loading dock throughout an entire loading or unloading operation.

Illustrative of the economy of manufacture of the members comprising the suspension and levelizing mechanism of this invention the coil spring, for instance, can be made as an extension type spring of oil tempered wire functioning at very low stress which is the most economical of all types of manufacture. The control arms are preferably made from steel stampings. The ball and socket joints are of a well known conventional type. The hydraulic system is in general very simple and is operative at relatively low pressures of from 200–500 p.s.i.

In general, the present invention will considerably improve riding comfort and lessen fatigue imposed upon the driver of the vehicle over long distances.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring suspension for supporting a vehicle frame on a wheel comprising: upper and lower vertically spaced control members pivotally connected to said frame; wheel axle structure flexibly connected to said members so as to permit relative vertical movement between said axle structure and said frame when said members pivotally move; a moment arm on one of said members; a lever arm on the other member; a spring means having an end operatively connected to and shiftable along the length of said moment arm and an opposite end mounted on said lever arm, said spring biasing said members to desired position in relation to said frame, and means for shifting the point of connection of said spring means to said moment arm.

2. The spring suspension of claim 1 wherein said means for shifting the point of connection of said spring means to said moment arm is automatically responsive to a change in angle of pivot of a control member in relation to the frame.

3. A spring suspension for use in supporting a vehicle frame on a wheel axle structure comprising: upper and lower control arms connected for pivotal movement on parallel axes upon said frame; means pivotally connecting said arms to the axle structure to permit relative up and down movement between the axle structure and the frame when said arms pivotally move; a moment arm rigid with said upper arm and projecting essentially toward the axle connecting means of said lower arm; said lower control arm being in the form of a bell crank having a short arm intersecting with a long arm, the means pivotally connecting said lower control arm and said frame being substantially at the intersection of said short arm and long arm and said axle connecting means being at the end of said long arm; and a tension spring having one end connected to the end of said short arm and its other end connected for movement along the length of said moment arm.

4. The suspension defined in claim 3 wherein a fluid motor is provided in the suspension assembly operatively connected to said other end of said spring to shift said other end along the moment arm; and a valve is provided operably connected to control said motor in response to a change in the angle of pivot of one of said control arms.

5. A spring suspension for supporting a vehicle frame on a wheel axle comprising: upper and lower substantially parallel spaced control arms pivotally connected to said frame by pivot shafts; means connecting said control arms to said axle to allow up and down movement of said axle and said frame in relation to each other when the control arms pivotally move; said upper control arm forming a base of a triangular member having arms intersecting between said upper control arm and said lower control arm; one of the arms of said triangular member forming a moment arm intersecting said upper control arm substantially at the pivot connection to said frame; said lower control arm being in the form of a bell crank having a short arm intersecting with a long arm; said bell crank being pivotally connected to said frame substantially at the intersection of said short arm and long arm; a tension spring having an end connected to the end of said short arm on said bell crank; an opposite end of said spring being connected at a point along the length of said moment arm; a hydraulically actuated motor having a movable rod connected to said spring and adapted to shift the point at which said spring is connected to said moment arm along the length of the moment arm; said pivot shaft for said lower control arm being fixed to said arm and being connected to a valve which is opened and closed by rotational movement of said shaft upon pivotal movement of said lower arm; said valve controlling the movement of the rod of said hydraulically operated motor to move said spring to a desired point along said moment arm in response to a predetermined degree of rotation of said shaft.

6. In a vehicle having a frame, a transverse axle structure supported at opposite ends by ground engaging wheels and suspensions between each end of the axle structure and the frame, each of said suspensions comprising a system of levers pivoted on the frame and operably connected to said axle structure at adjacent ends, a coil spring pivotally connected to one of said levers and pivotally and slidably connected to the other of said levers, a fluid pressure responsive actuated motor operatively coupled to said spring adjacent said slide pivot connection, a valve for controlling said motor to control the relative positions of said spring and other lever at said slide pivot connection, and mechanism for actuating said valve and operative whenever there is a predetermined change in vertical position of the frame relative to said axle structure.

7. A spring suspension for supporting a vehicle frame on a wheel comprising upper and lower vertically spaced control members pivotally connected to said frame, wheel axle structure flexibly connected to said members so as to permit relative vertical movement between said axle structure and said frame when said members pivotally move, a moment arm on one of said members, a lever arm on the other member, spring means having an end operatively connected to and shiftable along the length of said moment arm and an opposite end mounted on said lever arm, said spring means biasing said members to desired position in relation to said frame, means for shifting the point of connection of said spring means to said moment arm comprising a motor pivoted on the frame coaxially of said upper control member and operably connected to said point of connection, and control means for said motor responsive to pivotal movement of said lower control member.

8. In a self-leveling suspension for a vehicle having a frame adapted to be supported by an axle structure provided with a ground engaging wheel, upper and lower control arms flexibly connected at opposite ends to the axle structure and frame, a coiled tension spring, means supporting one end of the spring on the lower control arm, shiftable pivot means connecting the other end of the spring to the upper control arm, power means for automatically shifting said pivot means with respect to the flexible connection of said upper control arm to the frame in response to a change in relative level between the frame and the axle structure, and control means for said power means actuated by pivotal movement of one of said control arms.

References Cited in the file of this patent

UNITED STATES PATENTS

| | | |
|---|---|---|
| 1,020,385 | Cowey | Mar. 12, 1912 |
| 1,379,836 | Rackham | May 31, 1921 |
| 1,880,343 | Dunn | Oct. 4, 1932 |
| 2,018,427 | Taber | Oct. 22, 1935 |
| 2,587,443 | Crabtree | Feb. 26, 1952 |
| 2,818,273 | Weihsmann | Dec. 31, 1957 |
| 2,828,138 | Brueder | Mar. 25, 1958 |
| 2,882,041 | Gustafson | Apr. 14, 1959 |
| 2,957,701 | Rich | Oct. 25, 1960 |

FOREIGN PATENTS

| | | |
|---|---|---|
| 1,148,506 | France | June 27, 1957 |